Aug. 4, 1931.  T. F. HAMILTON  1,817,556
PROPELLER FOR AIRCRAFT
Filed June 18, 1929

INVENTOR
Thomas F. Hamilton
BY
Dodson + Roe
ATTORNEYS

Patented Aug. 4, 1931

1,817,556

UNITED STATES PATENT OFFICE

THOMAS F. HAMILTON, OF MILWAUKEE, WISCONSIN, ASSIGNOR TO THE HAMILTON STANDARD PROPELLER CORPORATION, OF WEST HOMESTEAD, PENNSYLVANIA, A CORPORATION OF PENNSYLVANIA

PROPELLER FOR AIRCRAFT

Application filed June 18, 1929. Serial No. 371,815.

My invention relates to that class of propellers which are made of steel and are hollow, being usually formed of two pieces welded together. Owing to the tremendous stress a propeller has to sustain, due to the varying conditions of flight—such as reaching an altitude where there would be excessive revolution, or in diving, etc.—there is grave danger of the weld coming loose, and if this occurs on the leading edge, the air will instantly blow up the propeller, with disastrous results, as the propeller is made hollow in order to decrease its weight. The attempts which have been made to overcome this danger of the breaking of the weld, by riveting the pieces together as well as welding them, brings about an increase of weight, which defeats the very purpose of the hollow propeller.

My invention has for its object, to construct a hollow propeller of a single piece of sheet steel, having its edges welded at the trailing edge of the propeller, so that should the weld give way there will only be a flutter, and the pilot can still make his landing safely.

My invention has for its further object, to use a sheet which tapers in thickness from the hub to the tip of the propeller, thus providing a maximum of metal at the hub where it is needed, which will furnish ample strength, and yet have the minimum of metal at the tip, where lightness is most desirable.

My means for accomplishing the foregoing objects may be more readily understood by having reference to the accompanying drawings, where are hereto annexed and are a part of this specification, in which—

Similar reference numerals refer to similar parts throughout the entire description.

Figure 1:
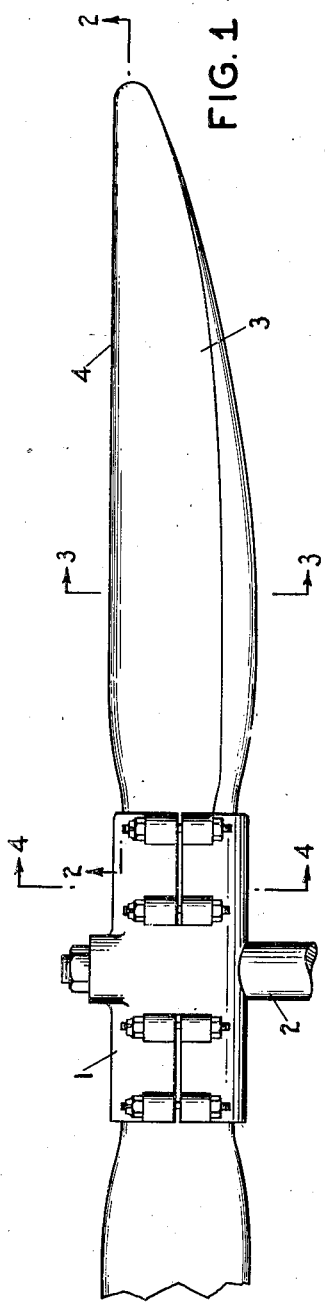
Fig. 1 is a perspective view of a propeller constructed in accordance with my invention.
Figure 4:
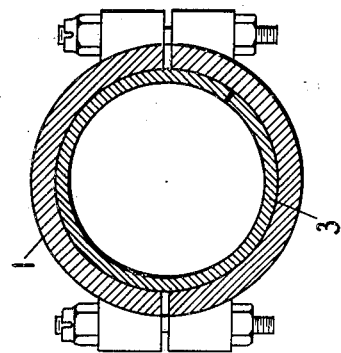
Fig. 4 is a cross-section, taken on the line 4—4 in Fig. 1.

As shown in the drawings, I have illustrated the conventional form of hub 1, which is mounted on the engine shaft 2, only a fragmentary portion of which is shown. In the hub 1 is mounted my improved propeller blade 3, a single one only being shown, as obviously the other is an exact duplicate.

In forming the blade, the sheet steel is drawn into the desired shape, providing for a straight leading edge 4. The excess metal is then trimmed off, forming the trailing edge 5. The inner edge of the plate forming the forward face of the propeller is chamfered at 6 so as to fit against the inside face of the other edge of the plate. The seam is then welded together, care being taken to avoid leaving any depressions, it being preferable to have the weld higher rather than lower, so that it can be ground smooth, which is essential to the best performance. The seam at the hub portion is also welded, and it can then be turned to fit the configuration of the hub 1 in which it is to be mounted.

Figure 2:
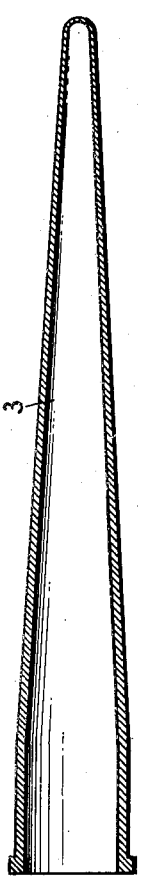
Fig. 2 is a longitudinal sectional view, taken on the line 2—2 in Fig. 1.
Figure 3:
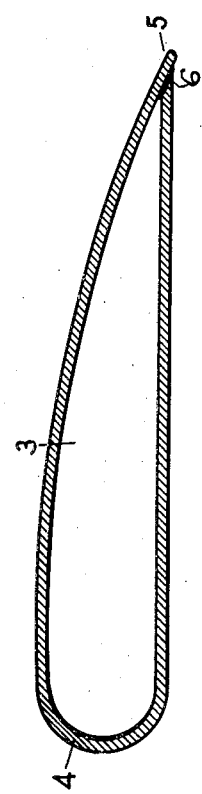
Fig. 3 is a cross-section of the blade, taken on the line 3—3 in Fig. 1.

From an examination of Fig. 2, it will be seen that I have provided for a distribution of metal so as to accomplish the desired results.

Having described my invention, what I regard as new, and desire to secure by Letters Patent of the United States, is:

A hollow aeronautical propeller blade made of a single sheet of steel bent upon itself to form the leading edge of the blade at the end, one edge of the sheet being chamfered and welded to the inside of the other edge adjacent the trailing edge of the blade.

THOMAS F. HAMILTON.